HERBERT W. THORNBURG, INVENTOR.

HERBERT W. THORNBURG,
INVENTOR.

BY *John Adam Thiery*
ATTORNEY.

Feb. 21, 1961  H. W. THORNBURG  2,972,388
WELL DRILL PIPE-HANDLING APPARATUS
Original Filed Aug. 14, 1953  9 Sheets-Sheet 4
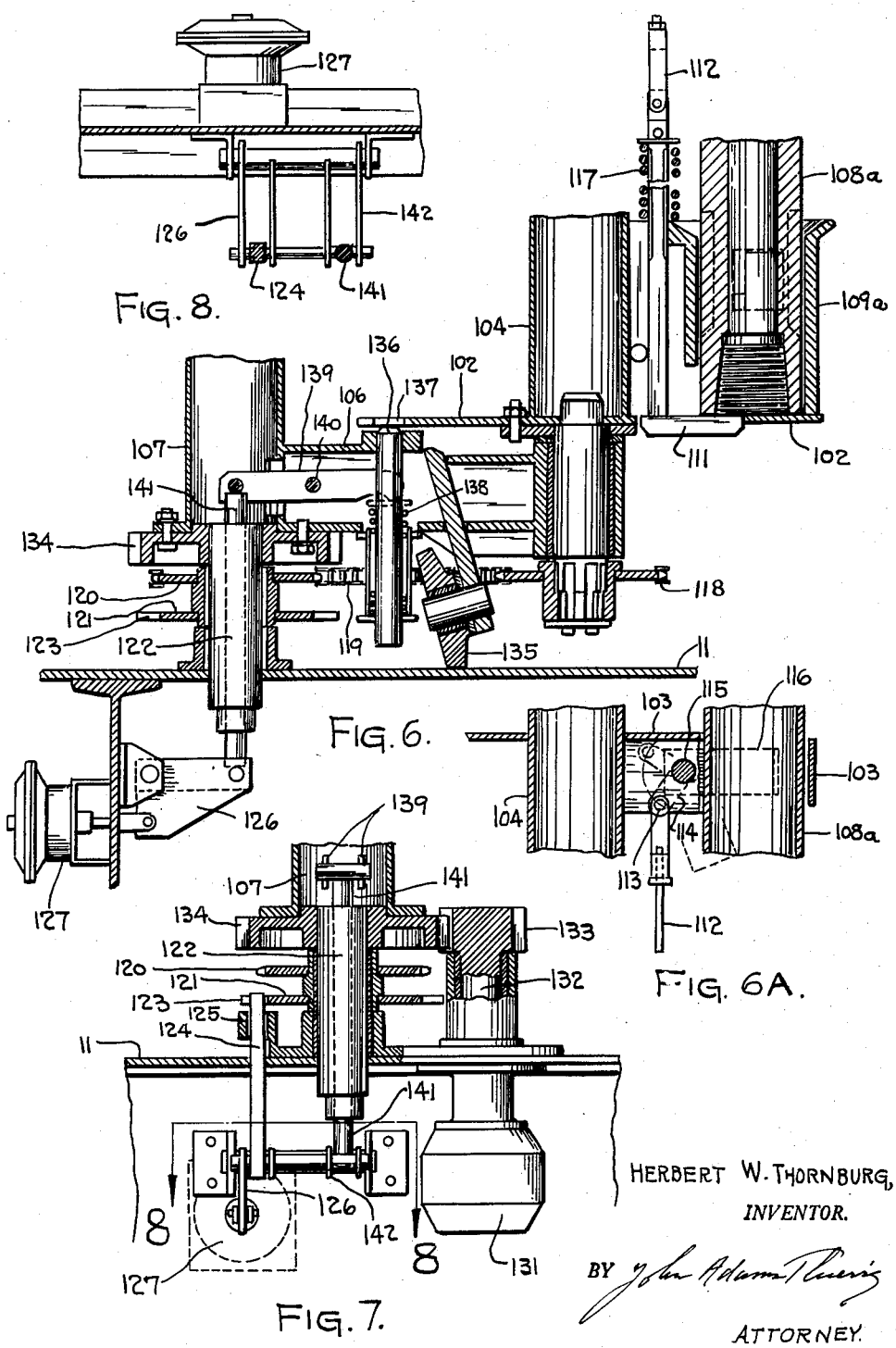
HERBERT W. THORNBURG,
INVENTOR.
BY
ATTORNEY.

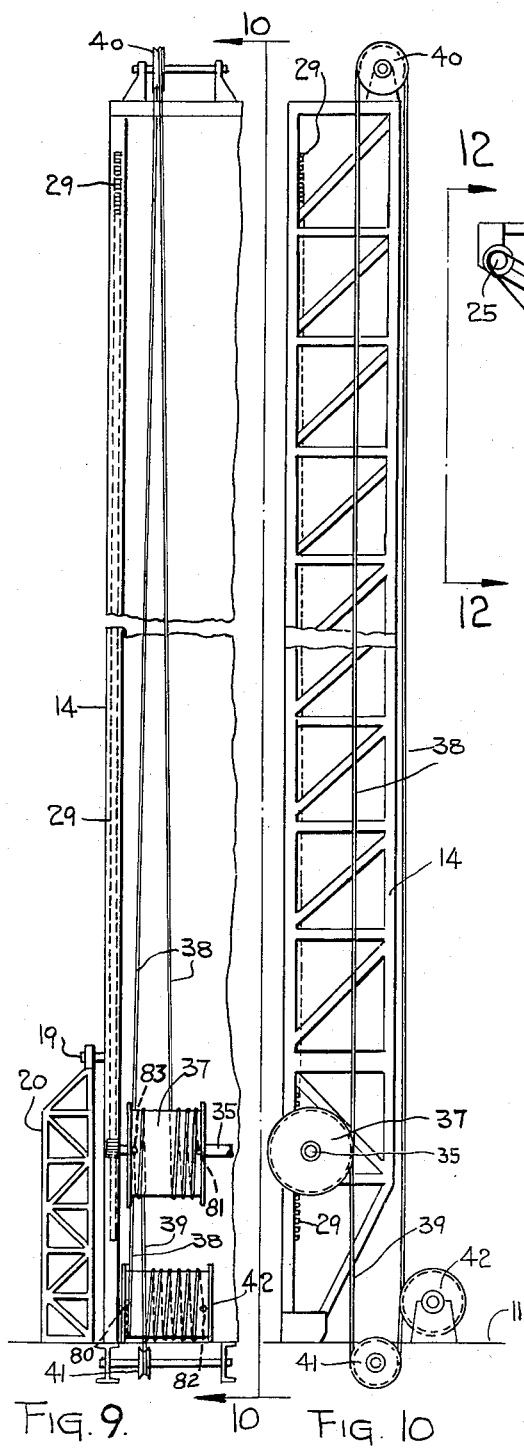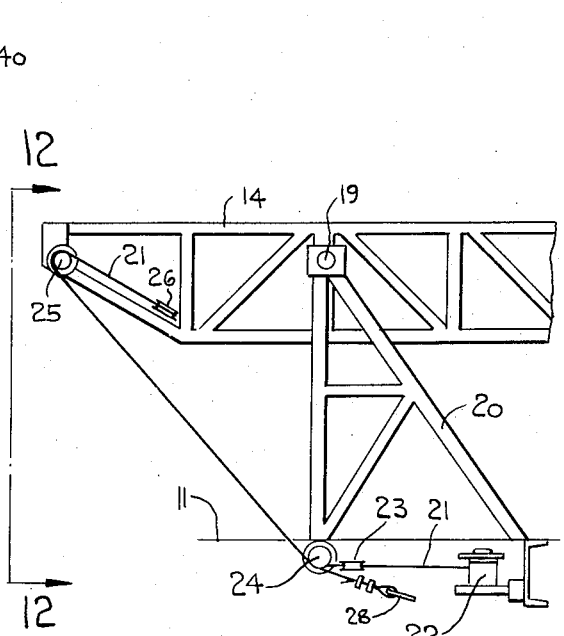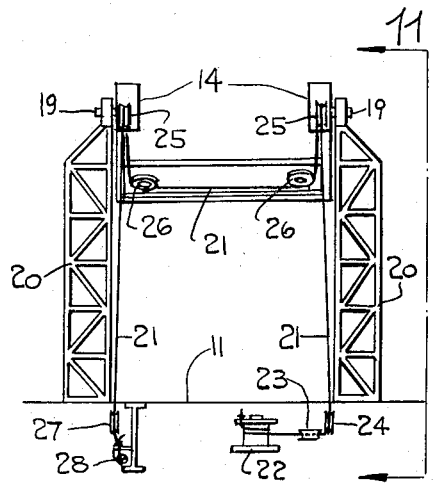

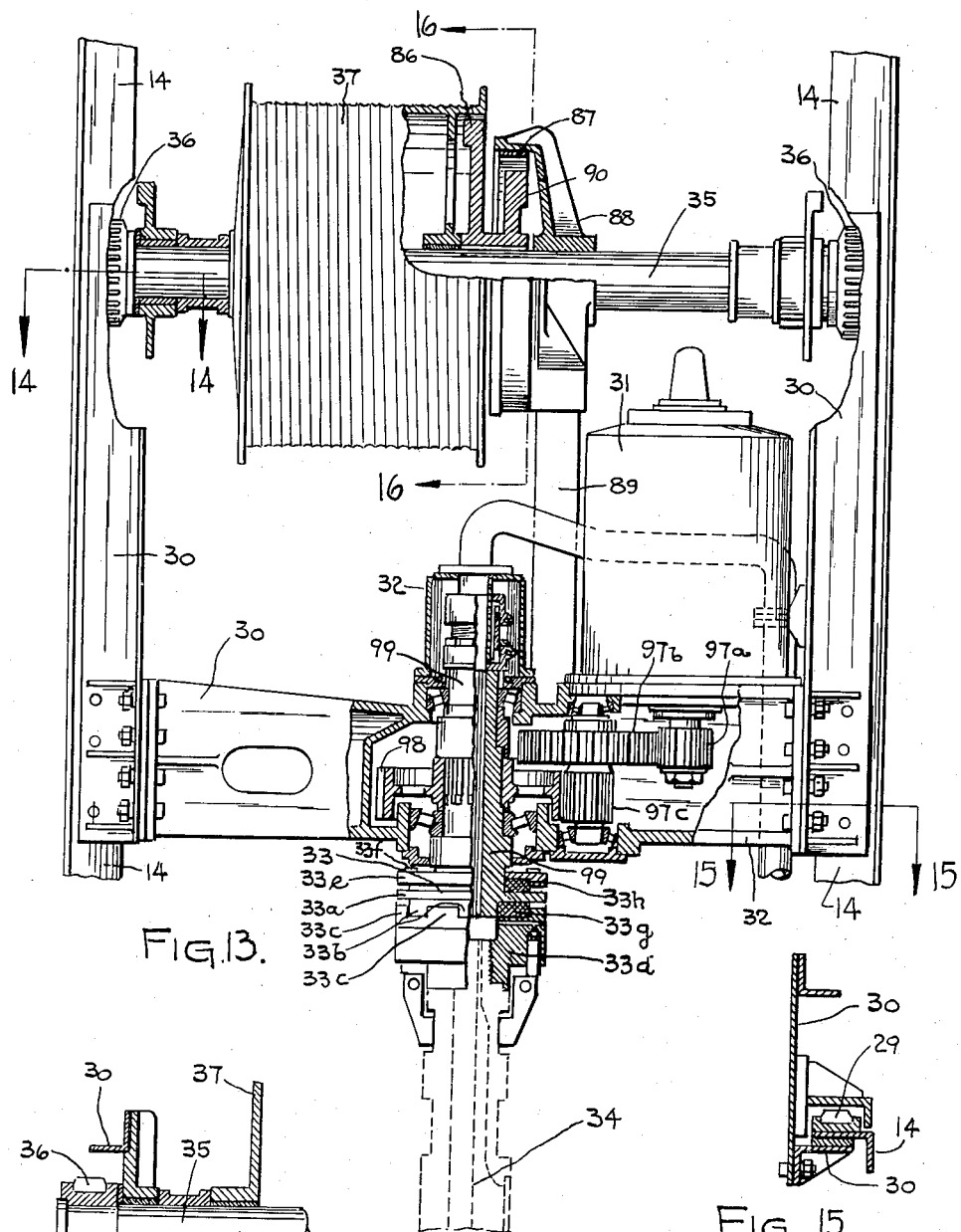

Feb. 21, 1961　　　H. W. THORNBURG　　　2,972,388
WELL DRILL PIPE-HANDLING APPARATUS
Original Filed Aug. 14, 1953　　　9 Sheets-Sheet 7

HERBERT W. THORNBURG,
INVENTOR.

BY *[signature]*

ATTORNEY.

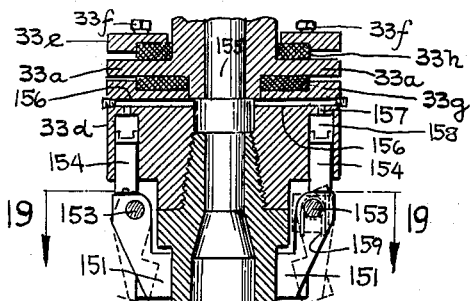
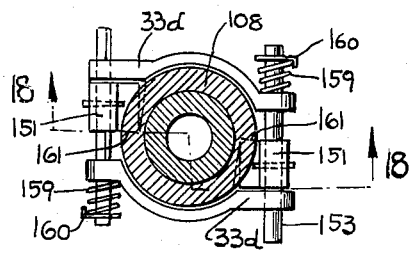
FIG. 19.
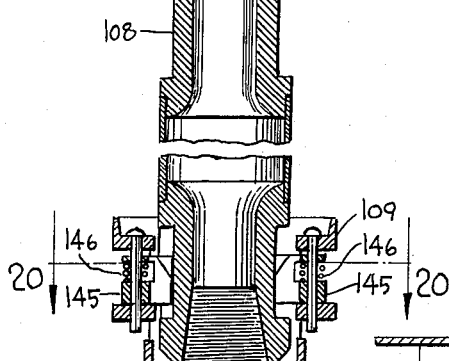
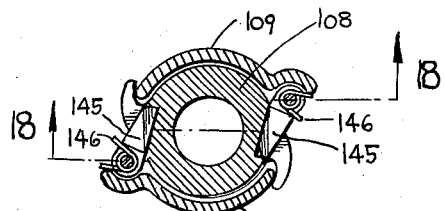
FIG. 20.
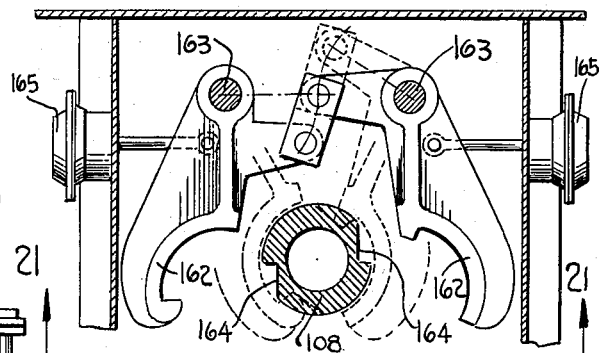
FIG. 22.
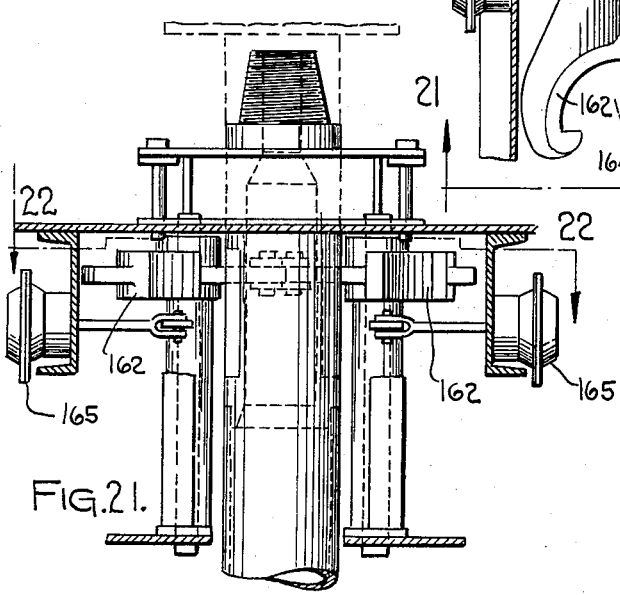
FIG. 21.
HERBERT W. THORNBURG,
INVENTOR.
BY *John Adams Thuring*
ATTORNEY.

Feb. 21, 1961  H. W. THORNBURG  2,972,388
WELL DRILL PIPE-HANDLING APPARATUS
Original Filed Aug. 14, 1953  9 Sheets-Sheet 9
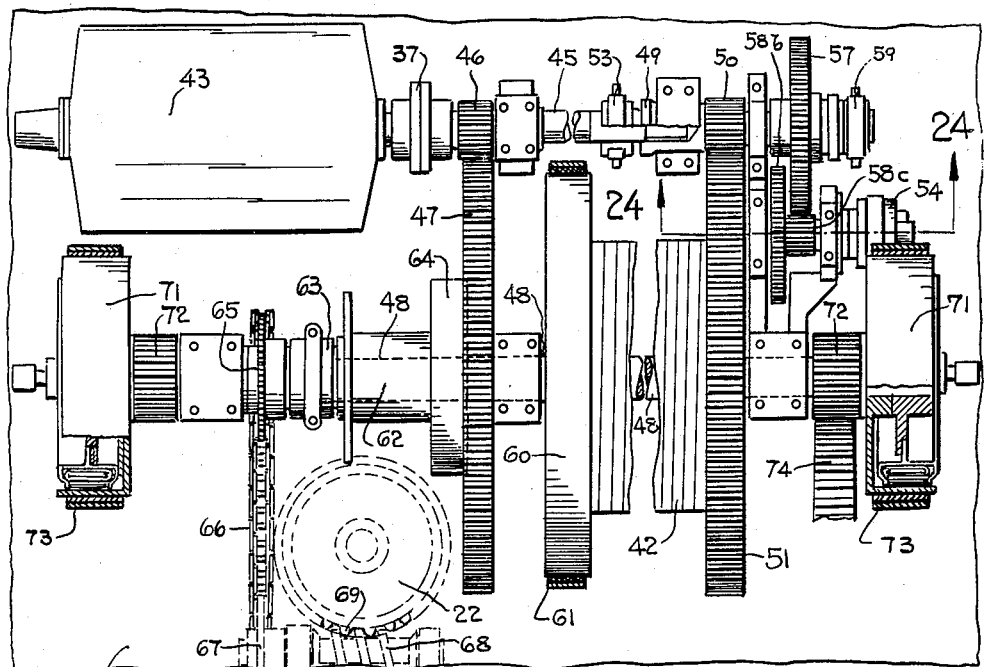
FIG. 23.
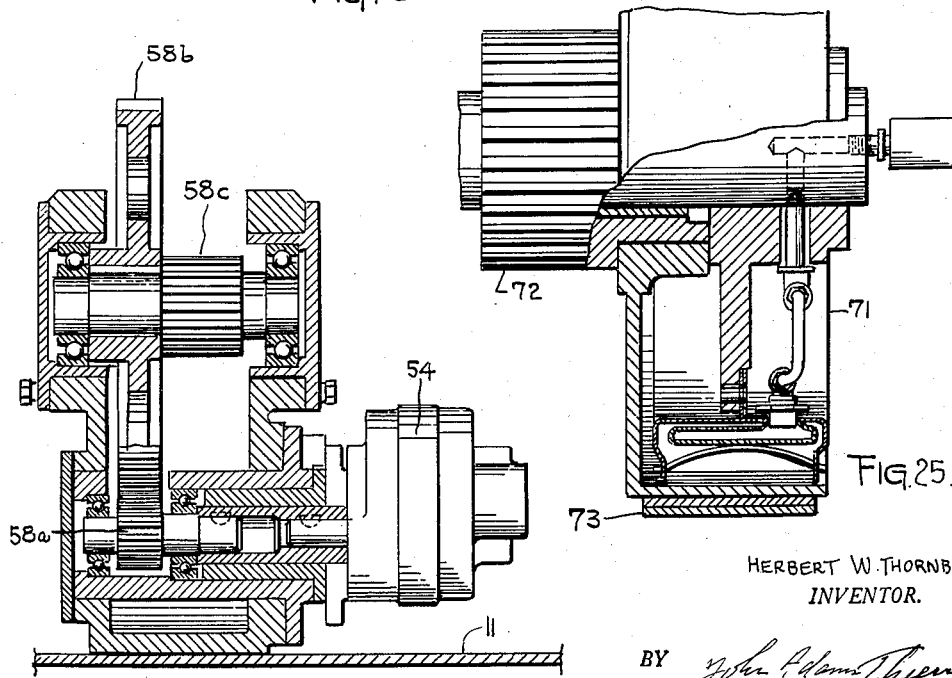
FIG. 24.
FIG. 25.
HERBERT W. THORNBURG,
INVENTOR.
BY
ATTORNEY.

United States Patent Office 2,972,388
Patented Feb. 21, 1961

2,972,388
WELL DRILL PIPE-HANDLING APPARATUS
Herbert W. Thornburg, South Milwaukee, Wis., assignor to Bucyrus-Erie Company, Milwaukee, Wis., a corporation of Delaware Original application Aug. 14, 1953, Ser. No. 374,364, now Patent No. 2,869,826, dated Jan. 20, 1959. Divided and this application Oct. 25, 1954, Ser. No. 464,471

17 Claims. (Cl. 175—52)

This invention relates to well-drill pipe-handling equipment.

This invention is a divisional of copending application, Serial No. 374,364, filed August 14, 1953, for Rotary Well Drill.

The principal objects ot the invention are to provide an improved well-drill pipe-handling apparatus in which:

(1) Operation of the entire machine, including handling, insertion, make-up, disengagement, and removal of drill tools and drill pipe is accomplished by power means remotely controlled by a single man working at one position of control.

(2) Selection and moving of drill-pipe sections from rack to drill hole as well as rack storage of drill pipe is accomplished by a single remotely-controlled power-operated tool-handling unit.

In addition to the principal objects, above stated, a number of novel and useful details have been worked out which will be readily evident as the description progresses.

The invention consists in the novel parts and in the combination and arrangement thereof, which are defined in the appended claims, and of which one embodiment is exemplified in the accompanying drawings, which are hereinafter particularly described and explained.

Figure 6 is a vertical section, partly cut away, taken along the line 6—6 of Figure 5.

Figure 6A is a vertical section, partly cut away, taken along the line 6A—6A of Figure 4.

Figure 7 is a vertical section, partly cut away, taken along the line 7—7 of Figure 5.

Figure 8 is a horizontal section, taken along the line 8—8 of Figure 7, showing a portion of the tool-rack locking mechanism.

Figure 9 is a partial schematic end view of the derrick showing the hoist and pull-down reeving for raising and lowering the rotary drive unit on the derrick.

Figure 10 is a side elevation taken along the line 10—10 of Figure 9.

Figure 11 is an enlarged side elevation of the derrick and the derrick hoist reeving, with the derrick in horizontal travelling position.

Figure 12 is an end view of the derrick and the derrick hoist reeving, taken along the line 12—12 of Figure 11.

Figure 13 is an enlarged end view of the vertical traverse frame and the rotary driving unit.

Figure 14 is a horizontal section, taken along the line 14—14 of Figure 13, showing the gear and rack connection between the vertical traverse frame and the derrick.

Figure 15 is a horizontal section, taken along the line 15—15 of Figure 13, showing the sliding connection between the lower end of the vertical traverse frame and the derrick.

Figure 18 is a vertical section, taken along the line 18—18 of Figure 19, showing the set of tool wrenches at the joint between the rotary-drive coupling and the upper end of the top drill pipe and the set of tool wrenches that are built into each socket at the base of the tool rack.

Figure 19 is a horizontal section, taken along the line 19—19 of Figure 18, showing the tool wrenches at the upper end of the uppermost drill pipe.

Figure 20 is a horizontal section, taken along the line 20—20 of Figure 18, showing the tool wrenches that are built into each tool-rack socket.

Figure 21 is a vertical section, taken along the line 21—21 of Figure 22, showing the set of tool wrenches at the joint between the uppermost drill pipe and the next lower drill pipe.

Figure 22 is a horizontal section, taken along the line 22—22 of Figure 21.

Figure 23 is an enlarged plan view, partially in section, showing the main machinery for tool pull-down, derrick hoist, and propel.

Figure 24 is a vertical section, taken along the line 24—24 of Figure 23, showing the fluid pull-down motor and reduction-drive mechanism.

Figure 25 is an enlarged plan view, partly in section, of the propel clutch and brake.

Figure 1:
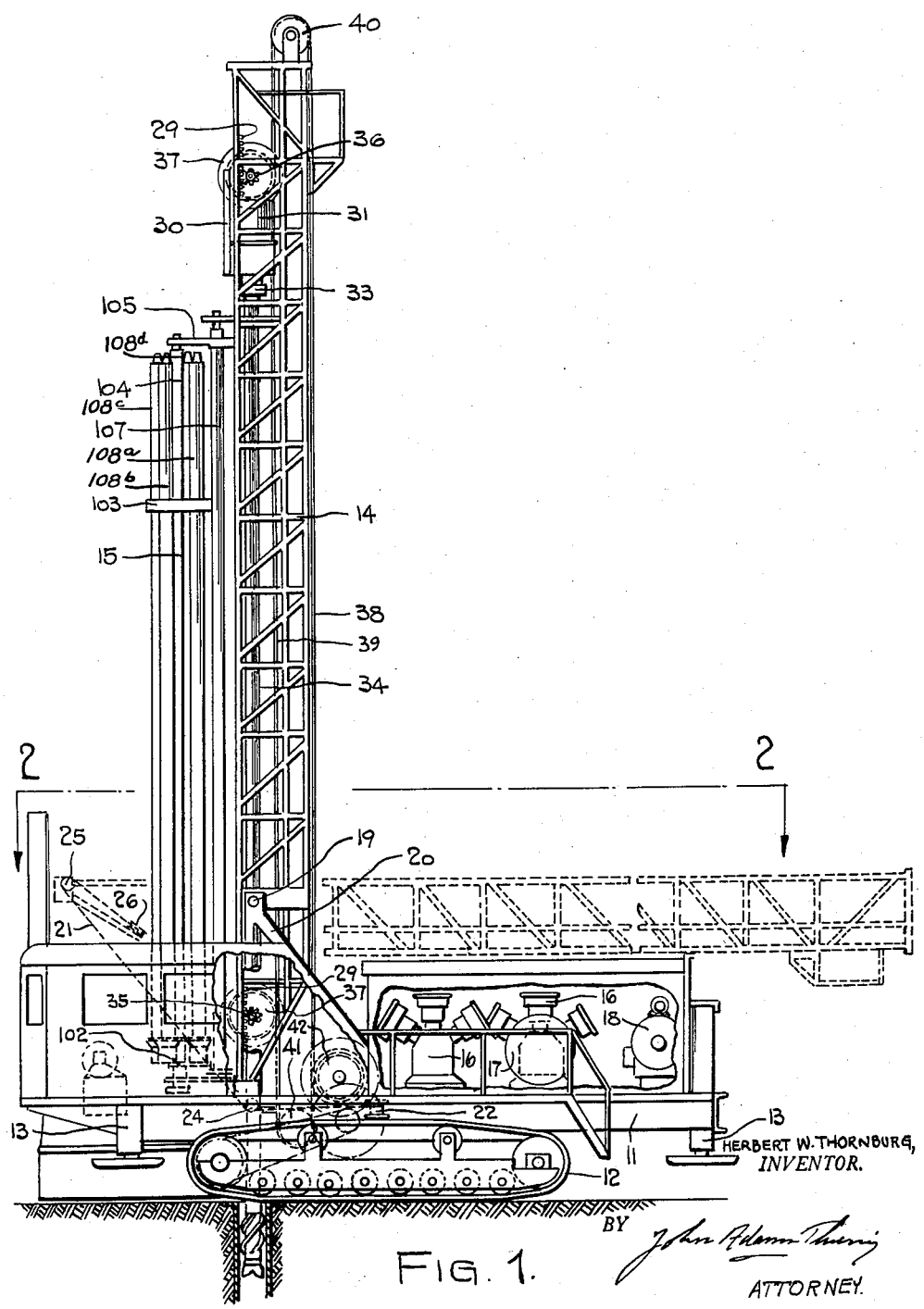
Figure 1 is a side elevation of a rotary blast-hole drill embodying the invention.
Figure 2:
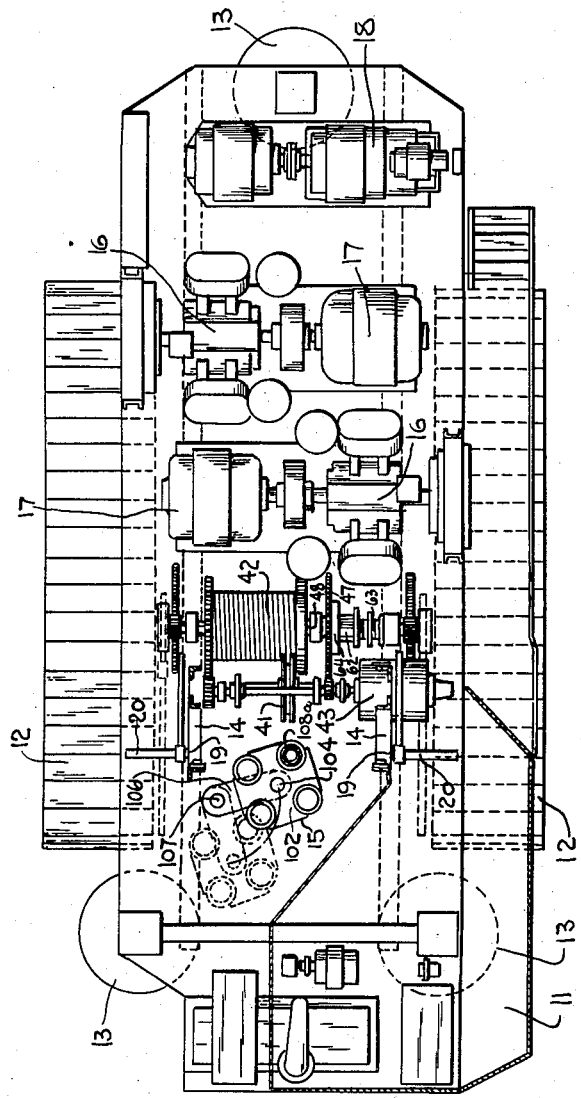
Figure 2 is an enlarged horizontal section taken along the line 2—2 of Figure 1, showing the lower main frame and main machinery of the drill.
Figure 3:
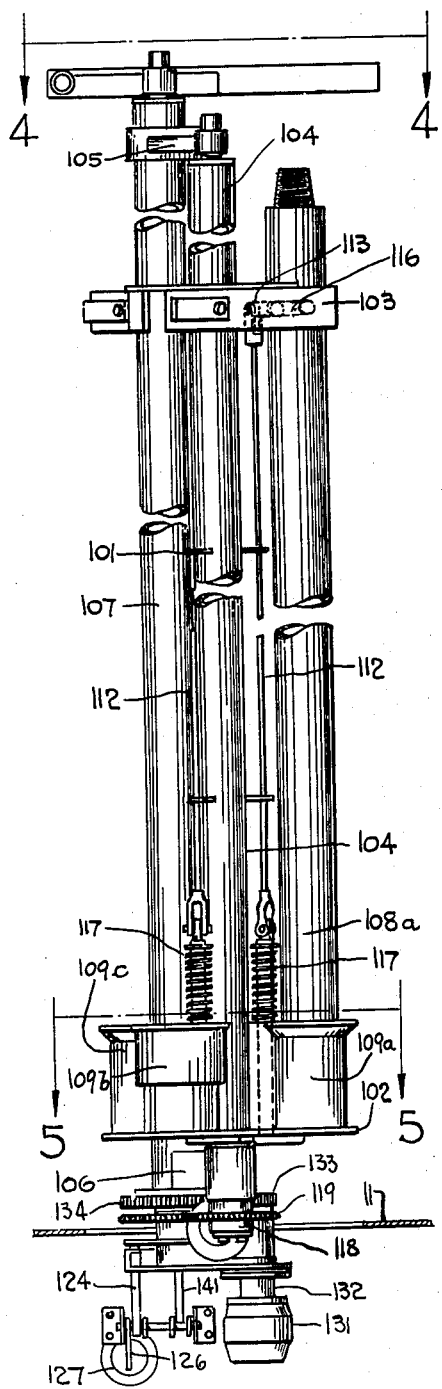
Figure 3 is an enlarged side elevation of the tool-handling unit of the drill of Figure 1.
Figure 4:
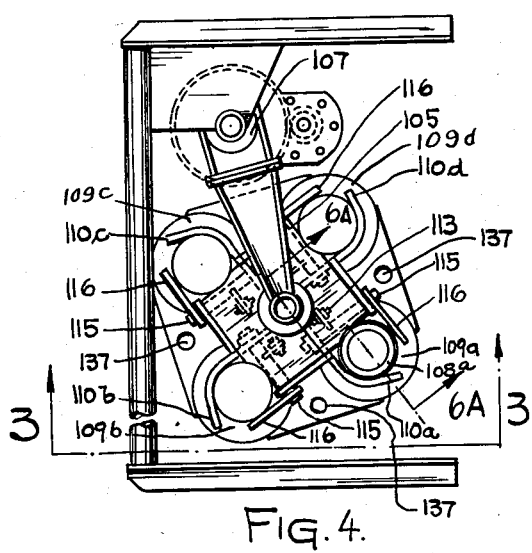
Figure 4 is a plan view, taken along the line 4—4 of Figure 3, showing the upper portion of the tool-handling unit.
Figure 5:
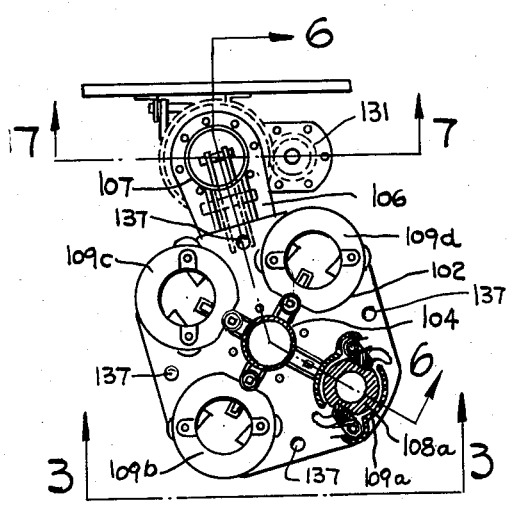
Figure 5 is a horizontal section, taken along the line 5—5 of Figure 3, showing the lower portion of the tool-handling unit.

Turning now to Figures 1 and 2, it is seen that the rotary drilling apparatus that is the illustrative embodiment of the invention, comprises a horizontal mobile base 11, preferably mounted on crawlers 12 and three hydraulic levelling jacks 13, which supports a derrick 14, tool-handling unit 15, air-compressors 16, compressor motors 17, motor generator set 18 and the main machinery (hereinafter decribed) for hoisting the derrick, raising and lowering the drill string together with its rotary-drive mechanism, handling drill pipe, and propelling the machine.

Derrick 14 is a one-piece unit that is pivotally mounted at 19 on A-frame 20 on base 11, so that it can be lowered from its normal vertical operating position to a horizontal travelling position (shown by broken lines in Figure 1). The derrick is raised and lowered by means of hoist cable 21 which runs (see Figures 11 and 12) from power-driven derrick hoist drum 22 on base 11 to and about guide sheaves 23 and 24 on base 11, thence about sheaves 25 and 26 located adjacent the lower end of the derrick and thence about guide sheave 27 to a dead-end 28 on base 11.

Vertical gear racks 29 rigidly mounted on the derrick provide tracks for vertical traverse frame 30 (see Figures 13 and 15) on which is mounted the rotary-drive unit for the drill-tool string. This rotary-drive unit consists of a Ward-Leonard controlled D.C. electric motor 31, an enclosed gear-case 32 containing gearing (hereinafter described) to connect the motor-drive shaft to the drive coupling 33 at the top of the drill-string 34. Horizontal shipper-shaft 35, rotatably mounted at the upper end of frame 30, is keyed to pinions 36, which engage the gear racks 29 on the derrick, and is connected to the shipper-shaft drum 37 through an automatic brake mechanism (hereinafter described). The vertical traverse frame 30 and the rotary drive and shipper-shaft machinery is raised and lowered on racks 29 by means of hoist cable 38 and pull-down cable 39 which are reeved (see Figures 9 and 10) from the shipper-shaft drum 37 about upper and lower fleeting sheaves 40 and 41 respectively at the upper and lower ends of the derrick, to the bull-reel drum 42 mounted on base 11. Rotating the bull-reel drum 42 in one direction (clockwise in Figures 1 and 10) pulls the vertical traverse frame 30 down, and rotating the bull-reel drum 42 in the opposite direction (counterclockwise in Figures 1 and 10) raises the vertical traverse frame 30 and hoists the drill string 34. The reeving and detailed operation of the hoist and pull-down cables and their associated apparatus will be described hereinafter in further detail.

Turning now more particularly to Figures 2 and 23—25, it is seen that the main machinery on base 11 is driven by main hoist and propel motor 43 which has a Ward-Leonard control and is supplied with power and controlled by motor generator set 18. The drive shaft of motor 43 is connected by flexible coupling 37 to one end of the main drive shaft 45 to which is splined propel pinion 46 which meshes with propel gear 47 keyed to the propel and bull-reel shaft 48. Therefore, whenever the motor 43 turns, the shaft 48 turns.

On the other end of main drive shaft 45 is rotatably mounted bull-reel pinion shaft 49 and bull-reel pinion 50 integral therewith which rotates about the axis of drive shaft 45 and engages the bull-reel gear 51. Drive shaft 45 and pinion shaft 50 are drivably connected at will by jaw clutch 53. Therefore, when motor 43 turns and clutch 53 is engaged, the bull-reel drum 42, which is keyed to its gear 51, turns to hoist or lower the frame 30.

The bull-reel drum 42 may also be driven to pull down frame 30 by the following-described alternative mechanism. Fluid motor 54 drives pull-down gear 57, rotatably mounted on the end of bull-reel pinion shaft 49, preferably through double-gear reduction gears 58a, 58b, and 58c (Figures 23 and 24). A second jaw-clutch 59 connects gear 57 to pinion shaft 49 so that when the fluid motor 54 is actuated to turn and jaw-clutch 59 is engaged and jaw-clutch 53 is disengaged, the fluid motor 54 will drive the bull-reel drum 42, through pinion 50 and bull-reel gear 51.

Thus the bull-reel drum 42 may at will be driven alternatively at slow speed with high torque by the fluid motor 54 which has a relatively-high force-speed ratio or at higher speed with low torque by the electric motor 43 which has a relatively-low force-speed ratio.

At the end of bull-reel drum 42 adjacent propel gear 47, is rigidly mounted bull-reel brake housing 60 for an external contracting-type brake band 61 for the drum. This brake is mechanically controlled by conventional means not shown. Therefore, drill tools may be lowered by the drum 42 under control of either the brake 60—61 or the electric motor 43.

An auxiliary-reel drum 62 is also mounted for rotation on and about propel shaft 48. This auxiliary-reel drum 62 is located adjacent propel gear 47, is drivably connected to drive shaft 48 by means of jaw-clutch 63, and is braked by a conventional band-type brake 64. This auxiliary drum is used for erecting machinery, handling pipe, braking bit joints, and numerous other jobs.

The jaw-clutch 63 that engages the auxiliary drum 62 is also used to engage derrick-hoist sprocket 65 to the drive-shaft 48. Sprocket 65 is drivably connected by chain 66 to sprocket 67 that is integral with worm-gear 68 that drives gear 69 on derrick-hoist drum 22. Therefore, when the motor 43 turns the drum-shaft 48 and clutch 63 is engaged with sprocket 65, the derrick-hoist drum 22 will turn to raise or lower the derrick.

Turning now to Figures 9 and 10, the bull-reel drum 42 and the shipper-shaft drum 37 are drivably connected with vertical traverse frame 30 by the following-described reeving to hoist and pull down the vertical traverse frame 30 on derrick 14. Two cables 38 and 39 are used in this reeving scheme, one cable 38 for hoisting and the other cable 39 for pull-down. With the shipper-shaft drum 37 in lowered position, as shown in Figures 9 and 10, the hoist cable 38 is anchored at one end 80 of the bull-reel drum 42 and one-half wrap is put around the drum. The cable 38 is then reeved over the upper fleeting sheave 40 located at the top of the derrick and then brought down to the shipper-shaft drum 37 in its lowered position. An appropriate number of wraps (sufficient to hoist the frame 30 to the top of the derrick) are then put on the shipper-shaft drum 37 and the cable 38 is then anchored at the end 81 on the drum 37. The pull-down cable 39 is anchored at 83 on the opposite end of the shipper-shaft drum 37 and one wrap is put around the drum in the opposite direction to hoist cable 38. The pull-down cable 39 is then brought down around the lower fleeting sheave 41 at the base of the derrick and reeved around the bull-reel drum 42 in the opposite direction to the hoist cable 38. An appropriate number of wraps of cable 39 (sufficient to hoist frame 30 to the top of the derrick) are put on the bull-reel drum 42 and the pull-down cable 39 is then anchored at 82 on the opposite end of drum 42. Therefore, as the bull-reel drum 42 turns in one direction, the shipper-shaft drum 37 and frame 30 is raised, and as it turns in the opposite direction the shipper-shaft drum 37 and frame 26 is pulled down.

The above-described hoist and pull-down reeving provides a positive and continuous downward pull as well as upward hoist on the drill string 34. Furthermore, since the horizontal axis of the shipper-shaft drum 37 intersects the vertical axis of the drill-tool stem, the pull-down is applied centrally to the drill string, thereby avoiding the excessive strains that would result from an eccentric pull-down.

Turning now to Figures 13 to 15, it is seen that not only the shipper-shaft drum 37, but also the rotary drive electric motor 31 and the rotary drive unit that connects the motor to and drives the drill string, are mounted in vertical traverse frame 30 that runs on gear racks 29 and travels with the drill string.

Figure 16:
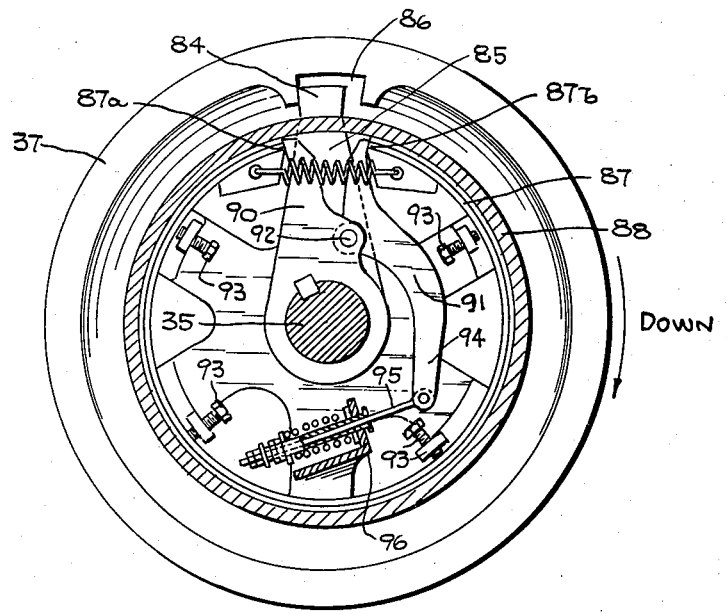
Figure 16 is a vertical section, taken along the line 16—16 of Figure 13, showing the brake mechanism of the shipper-shaft drum in set position.
Figure 17:
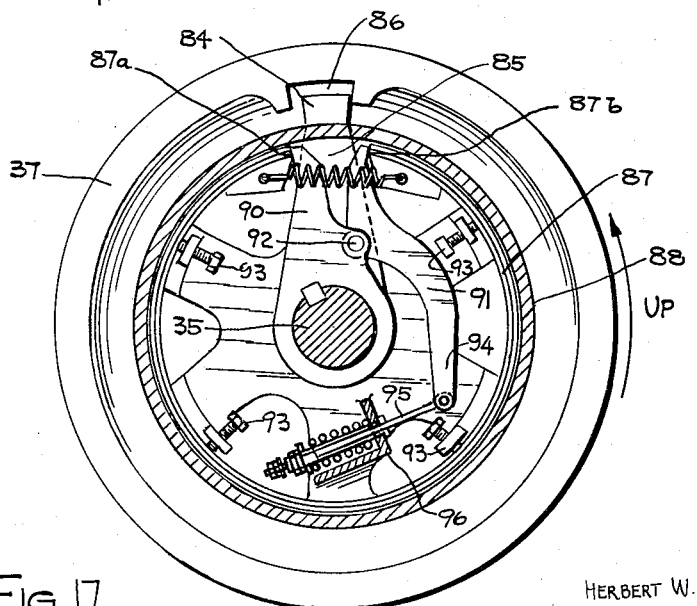
Figure 17 is a vertical section, similar to Figure 16, showing said brake mechanism in unset position.

Turning now to Figures 16 and 17, as well as to 13, it is seen that this device for preventing bouncing of the drill-bit is the following-described automatic brake on the shipper-shaft drum 37. Drum 37 is rotatably mounted on shipper-shaft 35, but free rotation of shaft 35 is limited by the amount that the head 84 of driver 85 can travel about shaft 35, to which it is keyed, within internal peripheral notch 86 on the housing of drum 37. Even such limited movement is restricted by internal expanding one-way brake band 87 which is mounted on drum 37 and frictionally engages the inner face of brake housing 88 rigidly mounted by support 89 (Figure 13) on frame 30. Brake-band 87 is actuated by arm 90 of driver 85, the outer end of which engages one end 87a of the brake band, and by bell-crank 91 which is pivotally mounted at 92 on arm 90 of driver 85 and engages the other end 87b of the brake band. Set screws 93 mounted on drum 37 maintain uniform contact of band 87 against brake housing 88. Arm 94 of bell-crank 92 is actuated by drum 37 through reach-rod 95 which is biased by lug 96 on drum 37 to release the brake band when the drum rotates counterclockwise (Figure 17), as during hoisting, and to set the brake band when the drum rotates clockwise (Figure 16), as during pull-down.

Turning now to Figure 16, it is seen that during pull-down of the drill string, with pull-down cable 38 in tension and actuating drum 37 to rotate clockwise, there will not only be positive driving engagement between the drum 37 and shaft 35 through driver 84, but brake band 87 will be set due to the fact that the drilling reaction on shaft 35 causes arm 90 of driver 85 to set one end 87a of band 87 and the opposite rotation of drum 37 and its lug 96 causes bell-crank 91 to set the other end 87b of band 87. If the drill bit starts to back-up, and movement is resisted not only by the drum 37 and cable 39, but even more positively by the automatic setting of brake-band 87 which in effect locks the shaft 35 to the derrick 14.

Turning to Figure 17, it is seen that when the drum is rotated counterclockwise, as in hoisting, the brake band 87 is automatically released due to the relative clockwise movement of driver 85 and its arm 90 away from end 87a of the band 87, and to the counterclockwise movement of lug 90 on drum 37 which rotates bell-crank 91 counterclockwise and releases the other end 87b of the brake-band. This frees the shaft 35 to rotate on the derrick. Driving engagement between shaft 35 and drum 37, necessary to hoist frame 30, is obtained through driver 85 when it makes contact with the opposite end of notch 86 on drum 37.

Turning now to Figure 13, it is seen that the lower portion of frame 30 carries the rotary drive machinery for the drill string and the coupling which provides not only a rotary-drive connection, but also a supporting connection, to the drill string so that the drill string can be raised and lowered as well as rotated. Reversible electric motor 31 is drivably connected, through reduction gears 97a, 97b, and 97c, to gear 98 which is splined to shaft 99 of rotary drive unit 32. The lower end of shaft 99 is connected by coupling 33 to the upper end of the drill string. (See Figure 18.)

Coupling 33 consists of: (1) driving flange 33a which is integral with the lower end of shaft 99 and has a plurality of peripheral lugs 33b on its lower face adapted to register with and have torsional driving contact with similar lugs 33c on the upper face of socket 33d; (2) socket 33d, which is threaded to make a threaded joint with the top drill pipe of the drill string and carries the tool wrench (hereinafter described) for locking same, (3) split collar 33e and bolts 33f which rigidly connect flange 33a to socket 33d to take the tension in hoisting the drill line, and (4) annular resilient washers 33g and 33h between the driving flange 33a and socket 33d on the under side and collar 33e on the top side. These resilient washers provide a flexible coupling between the rotary drive unit 32 and the drill pipe, so that the head of the drill string may wobble slightly, and vibrations in the drill string are absorbed instead of being transmitted directly into the rotary drive mechanism. Although these resilient washers provide a limited flexibility under compression and lateral forces, a rotary drive coupling is retained between lugs 33b and 33c.

Turning now to Figures 3 to 8 inclusive, it is seen that the tool-handling unit 15 provides rack storage for the drill pipe as well as a means for moving drill pipe from the rack to the drill hole. The tool-handling unit is preferably designed to store four drill pipes, so that with one drill pipe set up for drilling and three in the rack, a hole of normal depth can be drilled with the tools that are carried on the machine.

The tool-handling unit consists of the tool-rack 101, means rotatably mounting it on base 11 so that each pipe in the rack can be moved selectively into and out of position over the drill hole, means to actuate the tool rack into and out of such positions, and means to lock the drill pipes in or to release the drill pipes from the tool rack.

The tool rack 101 consists of a horizontal base plate 102 and a horizontal finger-board 103 rigidly mounted respectively at the lower and upper ends of vertical tool-rack post 104 which is mounted to rotate about its vertical axis on upper and lower horizontal bearing brackets 105 and 106 respectively. These brackets are rigidly connected to the upper and lower ends of main vertical post 107 which is mounted on base 11 to rotate about its vertical axis. Therefore, rotation of post 107 and its brackets 105 and 106 swings the tool rack 101 into and out of position over the drill hole, and rotation of the tool rack 101 about the axis of post 104 positions a particular drill pipe over the drill hole.

The four drill pipes, designated 108a to 108d (Figure 1) by their positions on the tool rack, that are stored on the machine for incorporation in the drill string, are held in tool rack 101 in vertical position by means of four base sockets 109a to 109d (Figures 4 and 5), arranged in a circle about post 104 on base plate 102 and four corresponding transverse fingers 110 arranged in a similar circle about the upper end of post 104 on the finger-board 103.

The lower end of each drill pipe 108 rests in its socket 109 on a hook 111 which is rigidly connected to the lower end of vertical reach-rod 112 that is at its upper end pivotally connected at 113 to one end of yoke 114 pivotally mounted at 115 on the finger-board 103. When hook 111 is pushed down by the weight of drill pipe 108, the arm 116 of yoke 114 will swing upwardly about yoke pivot 115 and lock the upper end of the drill pipe 108 in a depression of finger-board 103 directly above the corresponding socket 109 in the base plate 102. Removal of the weight of the drill pipe 108 from the hook 111 causes the hook 111 and its reach-rod 112 to be lifted by the spring 117 so that the arm 116 of yoke 114 is swung downwardly about pivot 115 to permit the drill pipe 108 to be removed from the finger-board 103 and the finger-board to be rotated away from the pipe.

Thus it is seen that, when a given drill pipe 108a in position over the drill hole is hoisted clear of its socket 109a by raising the rotary-drive unit to which the drill pipe is connected by a threaded joint, the pipe 108a is automatically released from the pipe rack which may then be retracted by swinging tool rack 101 about the axis of post 107, leaving the drill pipe suspended from the rotary drive.

Tool rack 101, comprising the tool-rack post 104, base plate 102 and finger-board 103 rigidly mounted thereon, together with the automatic locking and release mechanism described above, is rotatable about the axis of post 104 by means of a chain-sprocket drive which consists of sprocket 118 rigidly mounted on post 104 below base plate 102, sprocket chain 119, and sprocket 120 connected to sprocket 118 by chain 119. Sprocket 120 is combined in one piece with sprocket plate 121, both being mounted on shaft 122 for rotation about the axis of post 107. A plurality of peripheral notches 123 on sprocket plate 121 are adapted to be engaged by a vertically shiftably locking bar 124 which is mounted for relative vertical shifting movement in fixed housing 125 on base 11. Locking bar 124 is actuable to lock or unlock the sprocket plate 121 and sprocket 120 by bell-crank 126 which is actuated by cylinder piston-assembly 127 mounted below base 11. Thus it is seen that when locking bar 124 is actuated by cylinder-piston assembly 127 to lock sprocket plate 121 and sprocket 120 against rotation relative to base 11 about the axis of post 107, the tool rack 101 will be locked against rotation about the axis of post 104 so long as there is no swinging of the tool rack 101 about the axis of main post 107, and that when the tool rack 101 swings about post 107 with sprocket 120 locked by locking bar 124, there will be an equal rotation of the tool rack about the axis of its post 104. In other words, since sprockets 118 and 120 are the same diameter, a 90-degree swinging of the brackets 105 and 106 about post 107 with sprocket 120 locked will produce a 90-degree rotation of the tool rack 101 about post 104 relative to brackets 105 and 106. Accordingly, when it is desired to retract the tool rack from its position over the drill hole, after release of drill pipe 108a and incorporation of same into the drill string, and to move the next adjacent drill pipe 108b on the rack into position over the drill hole, this is accomplished by locking sprocket 120, swinging brackets 105 and 106 90 degrees (clockwise in Figure 5) about post 107, unlocking sprocket 120, and then returning the tool rack to its position over the hole by swinging it about post 107.

Fluid motor 131 located below base 11 is drivably connected through its vertical shaft 132 to pinion 133 which engages gear 134 keyed to the bottom of post 107. Thus when motor 131 rotates in either direction post 107 and the tool rack which it carries, swings about the axis of post 107.

As the brackets 105 and 106 swing about post 107, they are supported on base 11 by roller 135 that is mounted on and below lower bracket 106 and roll in a circle on base 11.

Rotation of the tool rack 101 about the axis of its post 104 may be prevented or permitted by locking bar 136 which is slidably mounted in lower bracket 106 and is adapted to engage one of four key-holes 137 in base plate 102 of the tool rack. Locking bar 136 is normally held in extended locking position by its spring 138, but may be depressed into released position by means of lever 139 which is pivotally mounted at 140 within bracket 106 and is actuated to lock and unlock locking bar 136 by means of connecting bar 141 and bell-crank arm 42.

It will be noted that both locking bars 124 (Figure 7) and 136 (Figure 6) are actuated simultaneously by air-cylinder piston assembly 127, and that, actuation of bell-crank 126 to unlock bar 136 will actuate locking bar 124 into locking position. Accordingly, whenever sprocket 120 is locked to permit limited rotation of tool rack 101 about post 104 as the brackets 105 and 106 are swung through 90 degrees, base plate 102 of tool rack 101 is released by locking bar 136 to permit such rotation; and whenever sprocket 120 is released, base plate 102 of tool rack 101 is simultaneously locked against rotation about its axis. Thus tool rack 101 is at all times locked against free rotation and is always under the control of the operator.

Referring to Figures 18 and 20 a set of tool-wrench pawls 145 are built into each socket 109 at the base of the tool rack 101 and are biased by springs 146 to automatically engage cooperating notches in the drill pipe. These pawls are beveled at the top of their inner face to permit the drill pipe 108 to be lowered through socket 109 as the drill pipe is rotated during drilling, and are mounted to permit right-hand rotation but prevent left-hand rotation of the pipe.

Tool wrenches are also employed to engage the upper end of the upper most drill pipe just below its connection to the rotary-drive coupling 33 (Figures 18 and 19) and to engage the upper end of the next lower-drill pipe below the base 11 (Figures 21 and 22).

The first set of wrenches, shown in Figures 18 and 19, consists of two pawls 151 mounted on either side of the lower end of rotary-drive coupling socket 33d to pivot about horizontal pins 153. Each pawl 151 is in the form of a bell-crank which is actuated, by the downward extension of plunger 154, to shift inwardly at its lower end and engage V-shaped notches in the upper end of the drill pipe. Each plunger 154 is actuated by compressed air which passes from the central core 155 of coupling 33 through transverse passages 156 and port 157 into chamber 158 in which the plunger 154 is seated. Thus it is seen that pawls 151 are automatically actuated to engage the drill pipe as soon as air pressure is built up in the core of the drill string, and thus permit left-hand rotation of the drill-pipe when the rotary drive unit is rotated in a left-hand direction of rotation. Spring 159 between coupling 33 and collar 160 of pins 153 bias each pawl 151 not only rotatably, so that it will normally return to disengaged position and thereby bias the plunger 154 to return to retracted position in chamber 158 when air pressure is reduced, but also tranversely to maintain engagement between the side face of the pawl 151 and the corresponding face 161 of the notch at the upper end of the drill pipe.

The second set of wrenches, shown in Figures 21 and 22, is mounted below the deck of base 11 and consists of hook-shaped pawls 162 mounted on the base 11 to pivot inwardly about vertical pins 163 and engage notches 164 at the upper end of the lower drill-pipe section, thereby preventing left-hand rotation and permitting right-hand rotation of the drill pipe. These pawls 162 are actuated by double-acting fluid motors 165.

The tool-handling unit is used in the following manner to make up a joint in the drill string:

(1) When the upper end of the drill pipe at the top of the drill string is near floor level of the base (Figure 21), tool-wrench pawls 162 (as shown and described in my copending application Serial No. 374,364, filed August 14, 1953) are engaged and the rotary drive is reversed until the rotary-drive coupling 33 is disconnected from the drill pipe which remains suspended on tool-wrench pawls 162.

(2) The rotary-drive unit 31 is then hoisted upwardly on the derrick sufficiently to clear the next length of drill pipe to be inserted.

(3) The tool-rack arms 105 and 106 swing the tool-rack 101 beneath the rotary-drive unit, centering a selected drill pipe on the rack over the hole and directly under the rotary drive.

(4) Using the vertical traverse mechanism, the rotary drive is then moved down to the top of the selected drill pipe and the rotary-drive coupling 33 is screwed on to the joint at the top of the drill pipe.

(5) The rotary-drive unit is then hoisted slightly and rotated clockwise (Figure 20) to lift the drill pipe clear of its base socket 109. As the drill pipe rises out of its socket, the trip mechanism 111 in the socket beneath the drill pipe actuates the yoke 114 in the finger-plate 103 to release the upper end of the drill pipe.

(6) The tool rack 101 is then retracted, so that the drill pipe hangs free of the rack from the rotary-drive unit.

(7) The rotary-drive unit is then lowered and the bottom-joint end of the drill pipe is screwed onto the top of the tool string in the hole by rotating the rotary drive.

(8) Tool-wrench pawls 162 are then retracted by motors 165, and drilling resumes.

On completion of the well the drill pipe and tools are withdrawn from the hole, dismantled, and restored to the tool rack, using the following procedure:

(1) The rotary-drive unit is hoisted until a full length of drill pipe is exposed above the floor of base 11.

(2) Tool-wrench pawls 162 are then engaged.

(3) The lower joint of the exposed drill pipe is then disconnected by reverse rotation of the rotary-drive unit.

(4) The exposed drill pipe is then hoisted so that the lower end of the drill pipe is above the level of the sockets 109 of the tool rack.

(5) The tool rack 101 is then swung into position so that the drill pipe can be lowered into an empty socket in the tool rack.

(6) The drill pipe is lowered into the empty socket and automatically pushes down hook 111 causing yoke 114 to swing up and lock the upper end of the drill pipe securely in place in the finger-board 103 of the tool rack.

(7) Reverse rotation of the rotary-drive unit permits pawls 145 to engage the notches 147 in the lower end of the drill pipe and prevent reverse rotation of the drill pipe.

(8) The upper joint between the rotary-drive coupling and the upper end of the drill pipe is then unscrewed by reverse rotation of the rotary drive.

(9) The rotary-drive unit is then raised, leaving the drill pipe in position in the tool rack.

(10) The tool rack is then retracted out of the way of the rotary-drive unit which may be lowered to make a connection to the next piece of drill pipe to be removed from the well.

Now that one embodiment of the invention has been described, it is to be understood that the invention is not to be limited to the specific form or arrangement of parts as herein described and shown.

I claim:

1. In a rotary well-drilling apparatus having a ground-supported base; a derrick supported by said base; a rotary drill bit; first power means to rotate said drill bit about its vertical axis; connecting means for drivably connecting said first power means to said drill bit, said connecting means including a plurality of drill pipes detachably connected end to end and coupling means connecting the uppermost drill pipe to said first power means; first support means for supporting said drill bit, said first power means, and said connecting means on said derrick for simultaneous vertical movement relative thereto, and second power means for power raising and power lowering said first support means on the derrick; the combination of a horizontal rack for storing and sorting said drill pipes before they are connected to said coupling means; a horizontal swing frame supporting said rack for rotation of said rack about a first vertical axis; means supporting said swing frame on said base for swinging said frame about a second vertical axis to move said rack into and out of position over the drilling axis; and third power means operatively connected to said swing frame to swing said swing frame about said second vertical axis and simultaneously to rotate said rack about said first vertical axis.

2. A rotary well drilling apparatus, according to claim 1, further characterized by the fact that the rack includes lock means actuable by the weight of a drill pipe, when said drill pipe is in position on said rack, to lock said drill pipe in said rack.

3. A rotary well drilling apparatus, according to claim 2, further characterized by having: second lock means operatively connected to said rack and to said swing frame to at will lock said rack to said swing frame and thereby lock said rack against rotation relative to said swing frame and releasable to at will release said rack for such rotation; and means operatively connected to said rack and said base to at will restrain said rack from independent rotation about said first axis, to rotate said rack a limited amount about said first axis when said rack and swing frame swing about said second axis and the second lock means is released, and to lock said rack against rotation about said first axis when said swing frame is stationary with respect to said base.

4. In a well-drilling apparatus having a ground-supported base; a derrick supported by said base; a drill tool; a plurality of vertically-disposed drill pipes adapted to be detachably connected end to end into a string, said string connected at its lowermost end to said drill tool; the combination of a horizontal rack for storing and sorting said drill pipes; a horizontal swing frame supporting said rack for rotation of said rack about a first vertical axis; means supporting said swing frame on said base for swinging said frame about a second vertical axis to move said rack into and out of position over the drilling axis; and power means operatively connected to said swing frame to swing said swing frame about said second vertical axis and simultaneously to rotate said rack about said first vertical axis.

5. In a well-drilling apparatus having: a ground-supported base; a derrick supported by said base; a drill tool; a plurality of drill pipes adapted to be detachably connected end to end into a string connected at its lower-most end to said drill tool and supported at its upper-most end by said derrick; the combination of: a horizontal rack for storing a plurality of said drill pipes, supported by said base and horizontally shiftable to shift selected drill pipes on said rack into and out of alignment with the drill axis; and lock means associated with said rack and actuable by the weight of a drill pipe, when said drill pipe is in storage position on said rack, to lock said drill pipe in said rack.

6. In a well-drilling apparatus having: a ground-supported base; a derrick supported by said base; a drill tool; a plurality of drill pipes adapted to be detachably connected end to end into a string connected at its lower-most end to said drill tool and supported at its upper-most end by said derrick; the combination of: a horizontal rack for storing a plurality of said drill pipes, supported by said base and horizontally shiftable to shift selected drill pipes on said rack into and out of alignment with the drilling axis; means for horizontally shifting said rack into and out of alignment with said drilling axis; a rotary drive unit, supported by the derrick, and including means providing a rotary drive connection with a selected drill pipe when said drill pipe is aligned with said axis, to rotate said pipe about said axis, said last-named means being connectable and disconnectable by relative rotation of said selected drill pipe and said rotary drive unit; means associated with said base for restraining rotation of a section of said drill string adjacent to and lower than said selected drill pipe to permit said selected pipe to be disconnected from said drill string by relative rotation of said pipe and said string; and automatic pipe wrench means associated with said rack and adapted to engage said drill pipe and to lock it against rotation in one direction about its longitudinal axis when it is on said rack in alignment with said axis and the rotary drive unit is rotated to break the connecton between said rotary drive unit and said pipe, and to permit rotation of said pipe in the other direction by said rotary drive unit.

7. A well-drilling apparatus according to claim 6, characterized by the fact that said pipe wrench means includes a pair of pawls adapted to engage cooperating notches on said drill pipe, said pawls having beveled inner faces to permit insertion of said drill pipe therebetween.

8. In an apparatus for handling drill pipe at a well hole, the combination of: a ground-supported base; a horizontal traverse frame shiftably supported by the base for horizontal movement relative thereto and adapted to support a plurality of drill pipes in horizontally-spaced vertical positions, for storing and sorting said drill pipes and shiftable to shift a selected drill pipe into and out of alignment with the well hole; first power means connected to the horizontal traverse frame to shift it into and out of position above the well hole and to shift a selected drill pipe thereon into and out of alignment with the well hole; a vertical traverse frame shiftably supported by the base for vertical movement relative thereto along the axis of the well hole; support means on the vertical traverse frame adapted to have a supporting connection with said selected drill pipe when said selected drill pipe is aligned with said axis, said connection being connectable and disconnectable by relative rotation of said selected drill pipe and said support means; second power means adapted to rotate said selected drill pipe about said axis when it is connected to said support means and to connect and disconnect said selected drill pipe and said support means; and third power means connected to the vertical traverse frame to power-raise and power-lower said vertical traverse frame to raise said selected drill pipe from said horizontal traverse frame when said selected drill pipe is connected to said support means, and thereafter, when said horizontal traverse frame is shifted out of alignment with the well hole by said first power means, to power-lower said selected drill pipe for rotary drilling under power of said second and third power means.

9. An apparatus for handling drill pipe at a well hole according to claim 8, further characterized by the fact that the horizontal traverse frame includes a swing frame pivotally supported by the base for rotation about a first vertical axis to swing the swing frame and rack into a position above the well hole, and a rack pivotally supported by the swing frame for rotation about a second vertical axis to rotate the rack into a selected position above the well hole to align a selected drill pipe on said rack with the well hole.

10. An apparatus for handling drill pipe at a well hole according to claim 9, further characterized by having a lock mechanism operatively connected to the rack and the base to restrain the rack from independent rotation about the second vertical axis, and to permit simultaneous limited rotation of said rack about the second vertical axis when said rack and swing frame swing about the first vertical axis under power of the first power means.

11. An apparatus for handling drill pipe at a well hole according to claim 8, further characterized by having a lock mechanism associated with the horizontal traverse frame and actuable by the weight of a drill pipe, when said drill pipe is in storage position on said horizontal traverse frame, to lock said drill pipe in said horizontal traverse frame.

12. An apparatus for handling drill pipe at a well hole according to claim 8, further characterized by having an automatic pipe-wrench mechanism adapted to engage said selected drill pipe and to lock it against rotation in one direction about its longitudinal axis when it is in storage position on said horizontal traverse frame and to permit rotation in the other direction in such position.

13. In an apparatus for handling drill pipe at a well hole, the combination of: a ground-supported base; a horizontal frame shiftably supported by the base for horizontal movement relative thereto; a rack shiftably supported by the horizontal frame and adapted to support a plurality of drill pipes in horizontally-spaced vertical positions, for storing and sorting said drill pipes, and for horizontal movement relative to said horizontal frame to shift a selected drill pipe into and out of alignment with the well hole; a vertical traverse frame shiftably supported by the base for vertical movement relative thereto along the axis of the well hole; a rotary-drive unit supported by the vertical traverse frame for vertical movement therewith along the axis of the well hole, said rotary-drive unit being adapted to have supporting and rotary driving engagement with a selected drill pipe aligned on the rack with said axis to rotate said pipe about said axis, and being engageable and disengageable from said selected drill pipe by rotation relative thereto about said axis under power of said rotary-drive unit; and power means connected to the vertical traverse frame to power-raise and power-lower the vertical traverse frame to raise said selected drill pipe from the rack, and thereafter, when the rack and the horizontal frame are shifted out of alignment with the well hole, to power-lower said selected drill pipe for rotary drilling under power of said rotary-drive unit.

14. In a well-drilling apparatus having a ground-supported base, a drill tool, a plurality of vertically-disposed drill pipes adapted to be detachably connected end to end into a drill string, said drill-string connected at its lower-most end to said drill tool; the combination of a storage and handling device for said drill pipes comprising a supporting frame; a rotary rack for receiving the drill pipes and having a vertical shaft; means on said rack for supporting the drill pipes and engaging the latter at points spaced apart a substantial distance along the lengths of the pipes; upper and lower bearing brackets in which said shaft is journaled at its upper and lower ends; swinging arms pivotally mounted on said supporting frame and by which said bearing brackets are carried; means for swinging said arms horizontally about their pivots to move said rack between spaced predetermined positions, in one of said positions a drill pipe being attachable to or detachable from said drill-string; and indexing means operatively associated with said rack and said swinging means for imparting a partial rotation to said rack on its vertical axis each time said swinging arms are swung horizontally in one direction.

15. A combination as set forth in claim 14 wherein said means for supporting the drill pipes on said rack comprises a series of sockets at the bottom of said rack for receiving the lower ends of the drill pipes and means associated with said sockets and engaging the drill pipes for holding the latter against rotation within their respective sockets.

16. A combination as set forth in claim 14 wherein the lower portion of said rack has sockets for receiving the lower ends of the drill pipes, and releasable means engages the upper portions of the drill pipes for holding the latter in position on the rack, said releasable means having operating members extending into said sockets and engaged by the drill pipes when the latter are in supported position on the rack and releasable when said pipes are lifted within said sockets.

17. A combination as set forth in claim 16, wherein said supporting means for said pipes includes sockets for the upper ends of the pipes, pivoted gates for closing the open sides of said sockets, and operating means is connected between said gates and said operating members and releasable by the latter to effect opening of said gates when the drill pipes are lifted within said sockets.

References Cited in the file of this patent

UNITED STATES PATENTS

| | | |
|---|---|---|
| 1,149,677 | Parker | Aug. 10, 1915 |
| 1,242,305 | Arey | Oct. 9, 1917 |
| 1,634,859 | Tibbetts | July 5, 1927 |
| 2,226,947 | Sheldon | Dec. 31, 1940 |
| 2,317,306 | Smith | Apr. 20, 1943 |
| 2,516,182 | Bury | July 25, 1950 |
| 2,531,930 | Woolslayer et al. | Nov. 28, 1950 |
| 2,594,098 | Vanderzee | Apr. 22, 1952 |
| 2,643,005 | De Jarnett | June 23, 1953 |